United States Patent [19]
Nickel et al.

[11] Patent Number: 6,079,582
[45] Date of Patent: Jun. 27, 2000

[54] TANK CLOSURE FOR THE FILL OPENING OF A FUEL TANK

[75] Inventors: Hans Nickel, Cottenweiler; Harald Schliemann, Waiblingen, both of Germany

[73] Assignee: Andreas Stihl AG & Co., Germany

[21] Appl. No.: 08/787,628

[22] Filed: Jan. 23, 1997

[30] Foreign Application Priority Data

Jan. 23, 1996 [DE] Germany .................. 196 02 253

[51] Int. Cl.[7] .................................. B65D 53/00
[52] U.S. Cl. ................... 220/238; 220/234; 220/375; 220/DIG. 33
[58] Field of Search ................. 220/234, 238, 220/375, DIG. 33; 215/359

[56] References Cited

U.S. PATENT DOCUMENTS

| | | | |
|---|---|---|---|
| 2,043,412 | 6/1936 | Klein | 220/238 X |
| 2,092,182 | 9/1937 | Ray | 220/238 |
| 2,604,225 | 7/1952 | Armstrong | 220/238 |
| 2,952,526 | 9/1960 | Carlson et al. | 220/328 X |
| 3,035,734 | 5/1962 | De Pew | 220/238 |
| 3,335,895 | 8/1967 | Santarelli | 220/238 |
| 4,113,138 | 9/1978 | Fields et al. | |
| 4,705,190 | 11/1987 | Mizusawa | |

FOREIGN PATENT DOCUMENTS

| | | | |
|---|---|---|---|
| 594784 | 3/1960 | Canada | 220/238 |
| 0027970 | 5/1981 | European Pat. Off. | |
| 940230 | 12/1948 | France | 220/238 |
| 1039095 | 10/1953 | France | |
| 1142325 | 9/1957 | France | |
| 517386 | 1/1929 | Germany | 220/238 |
| 2045032 | 3/1972 | Germany | |
| 6409983 | 3/1966 | Netherlands | 220/238 |
| 1201342 | 8/1970 | United Kingdom | |

*Primary Examiner*—Stephen K. Cronin
*Attorney, Agent, or Firm*—Robert W. Becker & Associates

[57] ABSTRACT

A tank closure for a fill opening of a fuel tank has a closing device extending axially through the fill opening of the fuel tank. The closing device includes a grip for actuating the closing device. The closing device also includes a first clamping member and a second clamping member movable axially toward one another. The first clamping member has a first clamping surface and the second clamping member has a second clamping surface. The first and second clamping surfaces face one another and define therebetween an annular chamber. The first and second clamping surfaces are positioned at an angle α to one another. The closing device also includes a radially elastically expandable sealing ring positioned in the annular chamber.

32 Claims, 8 Drawing Sheets

TANK CLOSURE FOR THE FILL OPENING OF A FUEL TANK

BACKGROUND OF THE INVENTION

The present invention relates to a tank closure for the fill opening of a fuel tank, especially for a fuel tank of a portable working tool with an internal combustion engine, the tank closure comprising a closure device penetrating the fill opening and a grip portion for actuating the closure device.

In U.S. Pat. No. 4,113,138 a tank for liquids with a tank closure is disclosed. The tank comprises a fill socket which is provided with an exterior thread. The tank closure is comprised of a substantially cup-shaped component with an interior thread so that the tank closure can be threaded onto the fill socket. The tank closure at its inner side is provided with a sealing comprised of an elastic material whereby the exterior edge of this sealing is clamped between an annular bottom surface of the tank closure and an upper annular surface of the fill socket.

Such a tank closure arrangement requires considerable constructive space in order to allow the arrangement of the corresponding threads required for threading. Corresponding to the number of thread windings the tank closure must be turned a corresponding number of times in order to be threaded onto the fill socket so that finally the sealing is clamped between the respective surfaces and the sealing action is achieved. Such a fill socket with screwed-on tank closure projects substantially past the actual contour of the fuel tank so that such an arrangement is not suitable for small fuel tanks with smooth contours. This is especially true for portable working tools such as, for example, motor chainsaws, trimmers, cutting devices etc. the manipulation of which would be impaired with such projecting fill sockets and tank closures being present.

From U.S. Pat. No. 4,705,190 it is known to arrange a tank closure in a recessed manner so that the tank closure does not project past the outer contour. However, the tank closure in this design is positioned in a recess within the vehicle body whereby between the tank and the tank closure an elongate filling pipe is provided. At the upper end of the filling pipe an inner thread is provided into which the pin-shaped section of the tank closure with external thread is to be threaded. Such an arrangement is also entirely unsuitable for fuel tanks of portable working tools because an elongate filling pipe and also the arrangement of a thread with multiple thread windings for threading the tank closure requires too much space and is detrimental to manipulating the working tool.

It is therefore an object of the present invention to provide a tank closure of the aforementioned kind which is simply insertable into the fill opening of a fuel tank having preferably a substantially smooth contour and which closes off the fuel tank in a reliable manner.

SUMMARY OF THE INVENTION

The tank closure for a fill opening of a fuel tank according to the present invention is primarily characterized by:

A closing device extending axially through the fill opening of a fuel tank;

The closing device comprising a grip for actuating the closing device;

The closing device comprising a first clamping member and a second clamping member;

The first and second clamping members movable axially toward one another;

The first clamping member having a first clamping surface and a second clamping member having a second clamping surface;

The first and second clamping surfaces facing one another and defining therebetween an annular chamber;

The first and second clamping surfaces positioned at an angle α to one another; and The closing device further comprising a radially elastically expandable sealing ring positioned in the annular chamber.

Advantageously, the first clamping member is a disk having a frusto-conical mantle surface and the frusto-conical mantle surface is the first clamping surface.

The second clamping member preferably comprises a ring positioned coaxially to the disk. The ring has an end face and the end face is the second clamping surface.

The second clamping surface extends at a right angle to a longitudinal axis of the closing device.

The disk preferably has a pin. The ring comprises a unitary disk member having an opening. The pin has a cross-section matching the contour of the opening. The pin is received in the opening so that the disk member is axially movably guided by the pin.

The cross-section and the contour have a circular-arc portion connected by a straight portion. One of the straight portions has a projection extending parallel to the longitudinal axis of the closing device. The other straight portion has a groove extending parallel to the longitudinal axis of the closing device.

Advantageously, the disk has a first outer diameter and the ring has a second outer diameter, wherein the first and second outer diameters have minimal play relative to the diameter of the fill opening so as to allow removal of the closing device from the fill opening.

The ring preferably comprises flange remote from the annular chamber and the flange rests at the peripheral edge of the fill opening.

The flange has preferably arc-shaped recess extending over an angular distance of up to 180°. The fill opening has an annular segment connected to the peripheral edge for engaging the arc-shaped recess. The annular segment extends over an annular distance identical to the angular distance of the arc-shaped recess.

The first clamping member is advantageously a first disk. The first disk comprises at least one first axial section having an upper end face. The upper end face is the first clamping surface. The second clamping member is a second disk and has a conical mantle surface. The conical mantle surface is the second clamping surface.

Preferably, the fill opening is an annulus formed at the fuel tank and extending into the interior of the fuel tank. The end of the annulus within the interior of the fuel tank has a radially inwardly extending step.

The fuel tank preferably has an axially outwardly projecting annular collar surrounding the fill opening. The annular collar has an inwardly curved inner wall and the inner wall has a curved transition into the inner wall of the annulus.

The inner wall of the annular collar has at least one inner radial projection and the second disk has a radial recess. The inner radial projection engages the radial recess.

The first disk preferably comprises a second axial section extending coaxially through the radially inwardly extending step and positive-lockingly secured thereat.

Expediently, the radially inwardly extending step has at least two ring segments and recesses interposed between the ring segments. The radially inwardly extending step has cutouts at the end face thereof facing the interior of the fuel tank. The second axial section comprises outer radial projections extending into the recesses interposed between the ring segments and engaging the cutouts.

Three of the ring segments, three of the recesses, and three of the outer radial projections are preferably provided. At least one of the ring segments and one of the recesses extend over an angular distance different from the angular distance of the remaining ring segments and recesses.

The first clamping surface extends preferably at a right angle to the longitudinal axis of the closing device.

The first disk preferably has a pin and the second disk has an opening. The pin preferably has a cross-section identical to the contour of the opening. The pin is preferably received in the opening so that the second disk is axially movably guided by the pin.

The closure device may further comprise a pressure member for transmitting the actuating movement of the grip portion for actuating the tank closure into a relative axial movement of the first and second clamping members.

The fuel tank has an axially outwardly projecting annular collar surrounding the fill opening and a sleeve portion connected to the annular collar remote from the fuel tank. The sleeve portion radially surrounds the pressure member and the grip.

The first clamping member is a first disk having a pin. The pressure member is supported on the pin so as to be rotatable about the longitudinal axis of the closing device. The closing device comprises at least one control path extending as a circular arc about the longitudinal axis. The pressure member cooperates with the at least one control path.

The first clamping member is preferably a disk having a frusto-conical mantle surface and the frusto-conical mantle surface is the first clamping surface. The disk has a pin. The pressure member is supported on the pin so as to be rotatable about the longitudinal axis of the closing device. The closing device comprises at least one control path extending as a circular arc about the longitudinal axis. The pressure member cooperates with the at least one control path.

The second clamping element may comprise a ring positioned coaxially to the disk. The pressure member comprises a ring segment including a centrally arranged ring element. The ring element has an inner diameter matching the outer diameter of the pin. The ring element has at least one cam connected to the surface facing the ring. The ring includes a surface provided with the at least one control path. The at least one cam cooperates with the at least one control path.

Preferably, the tank closure includes three of the cams and three of the control paths. The three cams are spaced at an angular distance of 120° relative to one another and the three control paths are spaced at an angular distance of 120° relative to one another. The control stroke of each one of the three control paths extends preferably over an angular distance of approximately 80°.

The ring segment has an axial height greater than the axial height of the ring element and the top surface of the ring segment projects upwardly past the upper end of the pin.

The grip portion is preferably a C-shaped bracket having free ends. The free ends are pivotably connected to the pressure member. The pivoting range of the grip from the rest position into an actuating position is preferably approximately 90°.

Each one of the free ends has a radially inwardly extending peg wherein the ring element has matching radial openings for receiving the pegs.

The tank closure preferably further comprises a securing element connected to the pin. The grip in the actuating position engages across the securing element and is rotatable together with a pressure member about the longitudinal axis of the closure device. The securing element comprises a cover plate and a U-shaped locking member connected to the cover plate so as to extend parallel to the cover plate. The U-shaped locking member comprises parallel legs. The pin has preferably tangential recesses and the parallel legs engage these tangential recesses.

The radial openings open toward the cover plate and the cover plate, in areas congruent with the radial openings, has radially extending cutouts having a width of one half a width of the radial openings.

Advantageously, the pressure member comprises elastic tongues with locking projections. The free ends of the C-shaped bracket has recesses for receiving the locking projections for securing the grip in the rest position at the pressure member. The pegs have an edge extending parallel to the axis of rotation of the grip and the edges, in the actuating position of the grip, are in abutment with the sidewall of the cutouts. Expediently, the sealing ring in a radially expanded position is pressed against the first and second clamping surfaces and against a wall surface defining the fill opening, wherein the wall surface is frusto-conical.

The essential advantages of the inventive tank closure are to be seen in that there is no need for a filling socket formed at the tank so as to extend outwardly or inwardly and that the tank closure can be easily and quickly fastened by axial movement between two clamping elements to thereby reliably and sealing close off the fill opening. Due to the axial movement of the clamping members relative to one another, respectively, toward one another, the sealing ring comprised of an elastic material is radially expanded and is thus pressed against the two clamping members as well as against a wall surface of a fuel tank in a sealing manner.

According to a preferred embodiment of the tank closure, a first clamping member is in the form of a disk with a frusto-conical mantle surface that forms a surface limiting the annular chamber. The-frusto-conical mantle surface is slanted so that the corresponding surface of the second clamping member delimiting the annular chamber can extend at a right angle to the longitudinal axis of the tank closure. It is thus expedient to provide the second clamping member such that it includes a ring arranged coaxially to the disk and having an end face which also forms a surface that delimits the annular chamber.

In order to achieve excellent centering of the tank closure within the fill opening and thus a uniform loading of the elastic sealing ring, it is advantageous that the outer diameter of the ring and of the disk are substantially identical relative to the diameter of the fill opening so as to be substantially free of play within the fill opening. In order for the force generated by the axial clamping of the two clamping members to be supported at the exterior of the fuel tank, it is expedient to provide the ring with a radial flange that is facing away from the annular chamber and rests at the edge of the tank surrounding the fill opening. In order for this second clamping member to be rotatably secured at the tank, it is especially advantageous to provide at the flange at least one depression to be engaged by a projection provided at the edge of the tank.

The first clamping member may be embodied as a disk having at least one axial section the upper end face of which forms the first clamping surface while the second clamping member is a disk having a substantially conical contour limiting the annular chamber is and forming the second clamping surface. Such an embodiment is especially useful when the sealing surface at the fill opening is not positioned at the interior of the tank but at the exterior of the tank. For this purpose it is expedient to embody the fill opening as an annulus formed at the fuel tank and the ring having a step that extends into the exterior of the fuel tank. This annulus thus allows for an exact guiding and centering of the closure device whereby the exterior end face of the annulus can serve as an abutment for the sealing ring. Preferably, the fuel tank is provided with an axial outwardly projecting annular collar which surrounds the fill opening annularly whereby the inwardly curved inner wall of the collar has a curved transition adjacent to the annulus.

This axial annular collar serves, on the one hand, as an insertion aid and, on the other hand, prevents a radial deflection of the sealing ring away from the annular chamber. In the clamped state the curved transition is pressed into the material of the rubber ring so that an increased pressing force and an increased sealing action are produced. With suitable measures at the step of the annulus forming the fill opening as well as at the second axial section of the disk, a bayonet-type closure (locking) between the closing device and the edge of the fill opening can be produced.

In order to uniformly force-load and widen the elastic sealing ring over the entire circumference of the clamping member, it is expedient to guide the two clamping members exactly axially so that a lateral deviation and thus the generation of non-uniform clamping forces can be avoided. For this purpose it is expedient to provide a pin at the disk on which a disk member formed as a unitary part of the ring is axially displaceably guided. In the same manner, the disk member of the second embodiment is guided. It is advantageous that the disk or disk member comprise an opening which corresponds to the cross-section of the pin. This allows for a coaxial guiding of the second clamping member on the pin of the first clamping member. In order to prevent rotation between the two clamping members, it is advantageous to provide the pin and the opening with a substantially circular cross-sectional shape which is provided with a chord of identical size. As an additional securing device it is possible to provide a tongue-and-groove arrangement at the pin or the opening. The tongue-and-groove arrangement extends parallel to the longitudinal axis.

In order to transform the movement of the grip for actuating the tank closure into a relative axial movement of the clamping member, it is expedient to provide a pressure member that is rotatably supported on the pin so as to be rotatable about the longitudinal axis of the closure device. Further, at least one curved path is provided which extends on a circular arc about the longitudinal axis so that the rotational movement of the grip results in an axial movement of the clamping member. The pressure member has preferably the shape of a ring segment to which is connected a centrally arranged ring element the inner diameter of which corresponds to the outer diameter of the pin. With such an arrangement of the pressure member on the pin of the first clamping member the pressure member is rotatable about the longitudinal axis of the closing device. At least one cam is arranged at the side of the ring element facing the second clamping element. The cam(s) cooperate(s) with the curved path(s) on the side of the disk facing the ring element.

For a uniform force distribution across the entire circumference and for avoiding clamping forces resulting from axial displacement of the components movable relative to one another, it is advantageous that respectively three cams and three curved paths are provided so as to be spaced relative to one another at an angular distance of 120° whereby the control stroke of each cam at its respective curved path extends over an angular distance of preferably approximately 80°. The axial height of the ring segment is greater than the axial height of the ring element. The upper side of the ring segment projects past the upper end of the pin. The ring segment, together with the grip and a securing element connected to the outer end of the pin, forms the outer border of the tank closure so that the upper end of the pin is completely covered. In this manner, the penetration of dirt can be avoided and the functional reliability of the parts of the tank closure moving toward one another can be ensured.

In a further preferred design the grip is mounted such that it is pivotable about an axis that is positioned at a right angle to the longitudinal axis of the fill opening. This has the advantage that even for small tank closures, due to the liftable grip, a sufficient torque can be applied for opening or closing the tank closure. After closing the tank closure, the grip is pivoted about the rotational axis extending at a right angle to the longitudinal axis of the fill opening so that the grip is placed flat onto the top part of the tank closure and thus forms together therewith a uniform continuous contour that can be slightly curved or can be planar. Thus, there is no impediment when working with the portable working tool as would be otherwise the case for projecting tank closures. Also, an accidental release of the tank closure by impacts acting in the tangential direction onto the tank closure is prevented.

The grip is expediently in the form of a substantially C-shaped bracket which is pivotably supported with its free ends at the pressure member. This type of support includes preferably the ring element being provided with two radially extending openings in which the radially inwardly oriented pegs at the free ends of the grip engage. As mentioned before, the grip portion is designed such that in its rest position it has a substantially uniform contour with the tank closure. While in the rest position the grip is thus resting flat at the tank closure in order to be able to use the tank closure, to open or close the tank, it must project from the plane of the pressure member. For this reason, it is expedient that between the two defined positions, i.e., the rest position and the actuating position, a pivot angle of approximately 90° is provided.

In its actuating position, the grip extends across the upper end of the securing element connected to the pin whereby the grip with the pressure member is rotatable about the longitudinal axis of the closure device. The securing element comprises preferably a cover plate which covers the arrangement in the outward direction as well as a U-shaped locking member with parallel legs forming a unitary part of the cover plate and extending parallel to the cover plate. The legs of the locking member engage tangential recesses of the pins so that the components, resting axially and in the circumferential direction on the pin, are secured reliably at the pin. In order for the cover plate to form a smooth exterior surface together with the pressure member, the upper side of the ring segment is provided with a cutout in which the edge of the cover plate can come to rest.

For mounting the grip portion at the pressure member, the radial openings within the ring element are open toward the cover plate and, after completed mounting of the grip at the pressure member, are covered by the cover plate. As a securing means against accidental rotation of the grip together with the pressure member about the longitudinal axis of the closing device, the cover plate is preferably provided within the area congruent to the radial openings with substantially radially extending cutouts the width of which corresponds substantially to half of the width of the radial openings for receiving the pegs provided within the ring element. In this manner, the longitudinal edges of the cutouts in the cover plate provide abutments for the peg-shaped projections of the C-shaped bracket forming the grip. Only when the grip is axially pressed by the operator against the tank closure, the edges serving as abutments at the cover plate are overcome and a rotation of the grip with the pressure member about the longitudinal axis of the tank closure is possible.

In order to secure the grip portion in its rest position so that it cannot be accidentally moved into the actuating position during operation of the working tool, it is expedient to provide between the pressure member and the grip a locking means so that the grip is secured in the rest position. This locking means will preferably include elastic tongues at the pressure member provided with locking projections and recesses provided at the peripheral edge of the free ends of the grip.

Since the tank closure is especially designed for portable working tools, its design should take into consideration also weight reduction, the use of light-weight materials etc. as well as an optimal selection of materials. For example, the grip may be provided at its side facing the clamping members with recesses, while the upper side of the grip may have a uniform contour with the pressure member. For improving manipulation for pivoting the grip from its rest position into the actuating position, it is advantageous to provide the grip with a depression at its outer edge so as to provide a gripping edge.

Depending on the design of the curved paths, at the second clamping member the respective ends of the curved path may be provided with abutments for the cams so that the angle of rotation of the pressure member relative to the second clamping member is defined. Radially external to the curved paths a projection may be formed at the side of the disk of the second clamping member facing the grip which projection can be inserted into a predetermined recess at the grip so as to ensure that the grip can be pivoted into the rest position only when the cam of the pressure member is positioned at a certain location of the curved path. At the same time, an accidental pivoting into the actuating position is prevented. In the expanded state of the sealing ring, it rests under pressure at the surfaces of the clamping members and at a wall surface that delimits the fill opening. The wall surface that delimits the fill opening is preferably of a frusto-conical design so that additionally a securing in the axial direction is provided. The sealing ring is preferably an O-ring.

BRIEF DESCRIPTION OF THE DRAWINGS

The object and advantages of the present invention will appear more clearly from the following specification in conjunction with the accompanying drawings, in which.

DESCRIPTION OF THE PREFERRED EMBODIMENTS

The present invention will now be described in detail with the aid of several specific embodiments utilizing FIGS. 1–26.

Figure 1:
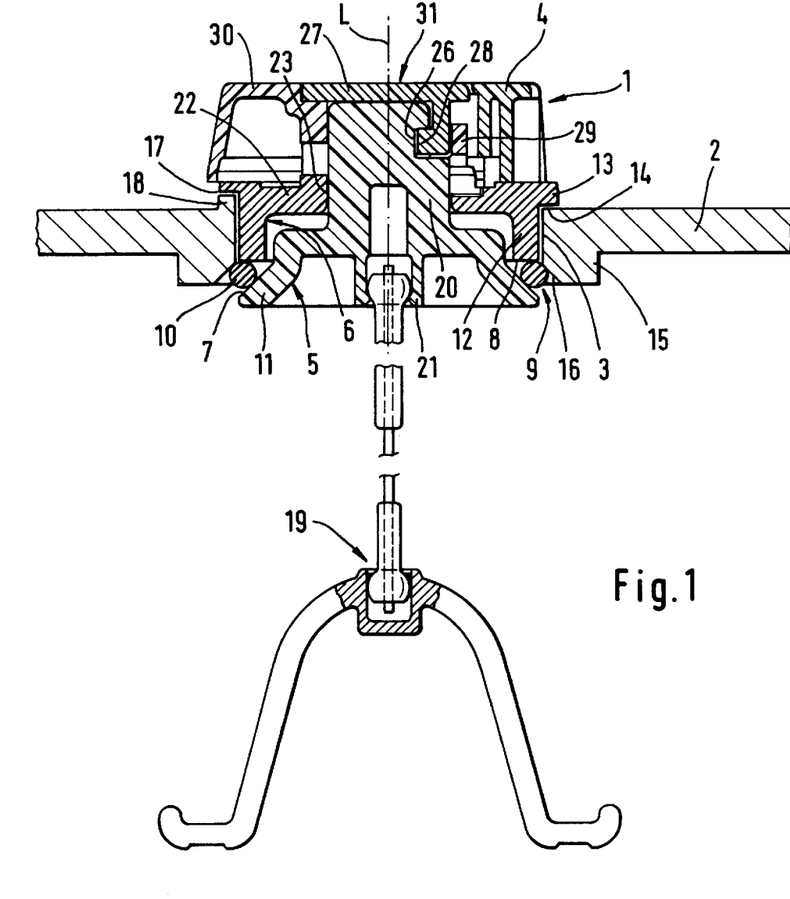
FIG. 1 is an axial section of a tank closure positioned in the fill opening of a fuel tank.

FIG. 1 shows an axial section of a tank closure whereby the closing device 1 is positioned in the fill opening 3 of a fuel tank 2. The fuel tank 2 is provided with an annular bead 15 surrounding the fill opening 3 whereby at the inner side of the tank at the fill opening 3 a frusto-conical surface 16 is formed. The closing device 1 comprises substantially a first clamping member 5, a second clamping member 6, a grip 4, and a pressure member 30. The clamping members 5 and 6 can be axially displaced toward one another whereby the first clamping member 5 comprises a first clamping surface 7 and the second clamping member comprises a second clamping surface 8. These clamping surfaces 7 and 8 extend at an angle relative to one another and delimit an annular chamber 9. In this annular chamber 9 an elastic sealing ring 10 is positioned which rests under pressure at the clamping surfaces 7 and 8 as well as at the wall surface 16 of the fill opening 3. The sealing ring 10, according to the representation of FIG. 1, is preferably an O-ring.

The first clamping member 5 is in the form of disk or plate 11 which has a conical mantle surface providing the first clamping surface 7. The second clamping member 6 is a ring 12 having an end face that delimits the annular chamber 9 and provides the second clamping surface 8. The ring 12 and the disk or plate 11 have the same outer diameter whereby the respective outer diameter corresponds to the inner diameter of the fill opening 3 and has only such an amount of minimal play relative thereto that is needed to allow easy axial insertion, respectively, removal of the closing device 1 into and out of the fill opening 3 of the fuel tank 2. At the disk 11 of the first clamping member 5 a pin 20 is provided which extends coaxially to the longitudinal axis L of the closing device 1. The ring 12 that serves as a second clamping member 6 has unitarily connected thereto a disk member 22 which is provided with a central opening 23. The cross-section of this central opening 23 corresponds to the cross-section of the pin 20 so that the second clamping member 6 can be axially displaceably guided on the pin 20. At the end face of the ring 12 facing the second clamping surface 8 a radial flange 13 is provided with which the second clamping member 6 rests at the edge 14 surrounding the fill opening 3. The flange 13 comprises a depression 17 which is engaged by a projection 18 provided at the edge 14.

Above the second clamping member 6 a grip 4 as well as a pressure member 30 are provided. The grip 4 is fastened in a manner to be explained in the following to the pressure member 30 which, in turn, is supported with a ring element 29 on the pin 20. For fixing the components that are movable relative to the first clamping member 5 on the pin 20, a securing element 31 is provided which comprises a locking member 28 which engages a cutout 26 at the pin 20. The securing element 31 comprises furthermore a cover plate 27 which projects past the upper end of the pin 20 and extends into a depression of the pressure member 30 so that it cannot slip off the pin 20. The underside of the disk 11 is provided with a holder 21 for a securing element 19 so that the closing device 1 removed from the fill opening 3 will not be lost.

FIG. 1 shows the closing device 1 in the clamped position, i.e., the first clamping member 5 and the second clamping member 6 are axially displaced toward one another to such an extent that the annular chamber 9 is reduced in size and the sealing ring 10 is pressed by elastic expansion against the frusto-conical surface 16 of the fill opening 3. For opening the fuel tank, the grip 4 is pivoted about an axis of rotation extending at a right angle to the longitudinal axis L of the closing device 1 and the grip 4 together with the pressure member 30 is rotated about the longitudinal axis L so that the first and second clamping members 5, 6 are moved away from one another. Thus, the distance between the clamping surfaces 7 and 8 is again increased so that the size of the annular chamber 9 is also increased. The elastic sealing ring 10 thus radially contracts so that its outer diameter is less than the outer diameter of the disk 11, respectively, the ring 12. Thus, the closing device 1 can be removed from the fill opening 3 of the fuel tank 2.

The fuel tank 2 is conventionally produced from plastic material, however, it can also be produced of metal. The clamping members 5, 6, the grip 4, the pressure member 3, and the securing element 31 are preferably made of plastic material, for example, polyacetal (POM).

Figure 2:
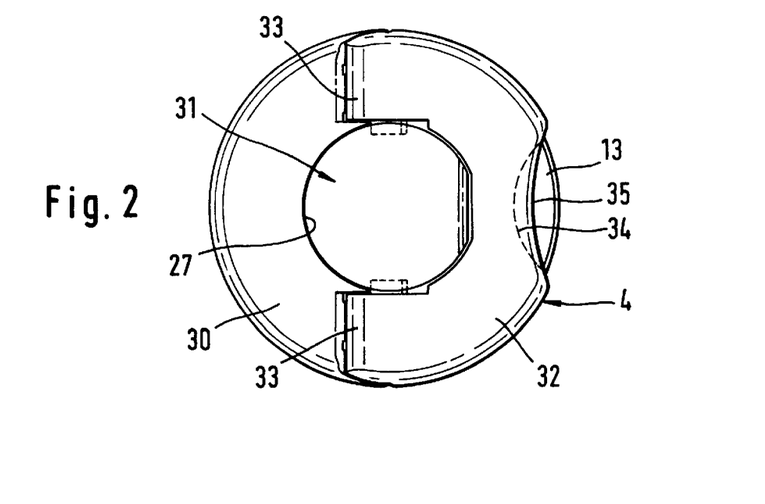
FIG. 2 shows a plan view of the tank closure of FIG. 1.

FIG. 2 shows a plan view of the tank closure in FIG. 1. The circular shape of the tank closure is provided by the grip 4, the pressure member 30, and the securing element 31. The cover plate 27 of the securing element 31 is substantially of a circular shape, which in the direction toward the grip 4, is provided with a chord. The grip 4 is a C-shaped bracket 32 the inner contour of which matches the shape of the cover plate 27. The bracket 32 with its free ends 33 is supported on the pressure member 40 the upper side of which has the shape of a ring segment so that the grip 4 and the pressure member 40 together form a ring surrounding the securing element 31. The grip 4, at the middle of the bracket 32, is provided with a recess 34 at its edge which is partially covered by the grip edge 35 at the upper side of the grip 4. This recess 34 and the grip edge 35 facilitate actuation of the grip portion 4 in order to bring it from its rest position into the actuation position.

Figure 3:
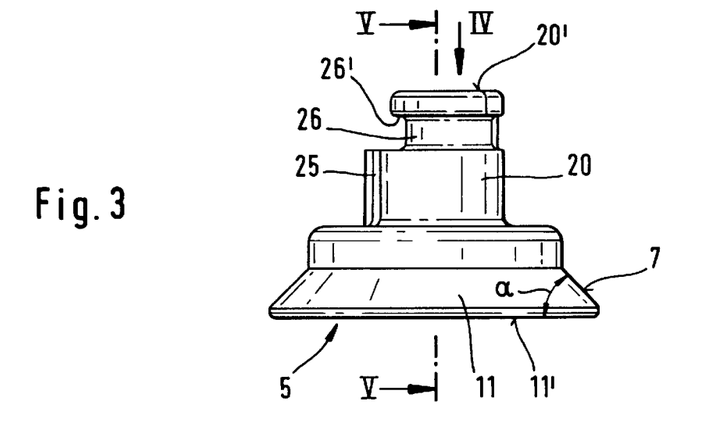
FIG. 3 shows a first clamping member as an individual part.

FIG. 3 shows the first clamping member 5 as an individual part. The disk 11 comprises an outer edge with the first clamping surface 7 which is positioned at an angle of approximately 45° to the underside 11' of the disk 11. At the central part of the disk 11 the upwardly extending pin 20 is provided which at its top end 20' is provided with tangential recesses 26 positioned at a right angle to the longitudinal axis of the pin 20.

Figure 4:
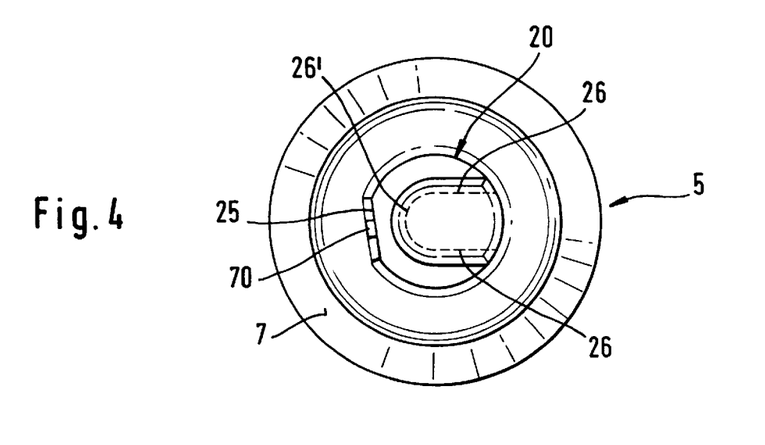
FIG. 4 shows a view in the direction of arrow IV of FIG. 3.
Figure 5:
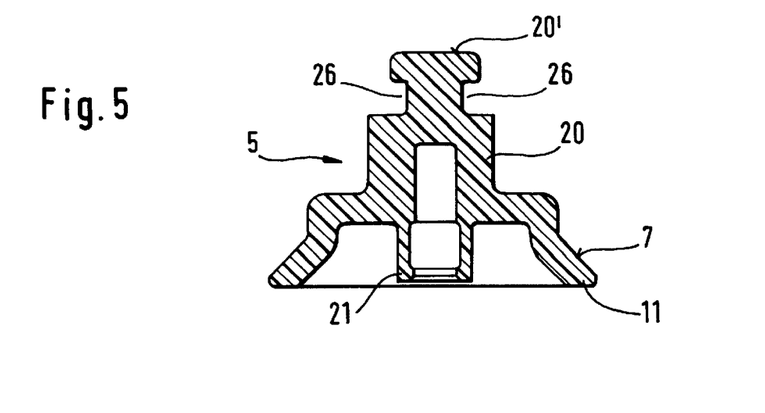
FIG. 5 shows a section along the line V—V of FIG. 4.

As can be seen especially clearly in FIG. 4, two parallel extending tangential recesses 26 are provided which at one end are connected by an arc 26'. The pin 20 comprises a substantially circular cross-section whereby a chord 25 intersects this circular shape. At the chord 25 a spring 70 is arranged which extends parallel to the longitudinal direction of the pin 20. This embodiment serves to secure the second clamping member 6 relative to the first clamping member 5 such that they cannot be rotated relative to one another. For this purpose, the opening 23 provided within the disk member 22 is also provided with a chord and with a groove that extends parallel to the longitudinal direction of the pin, as will be explained in the following in more detail. FIG. 5 shows a section along the line V—V of FIG. 4 from which the tangential recesses 26 become especially apparent.

Figure 6:
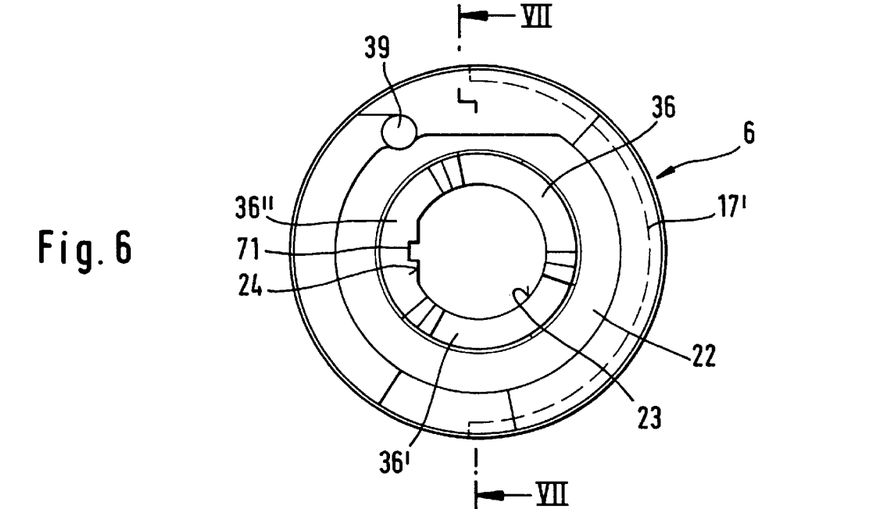
FIG. 6 shows a plan view of a second clamping member.
Figure 7:
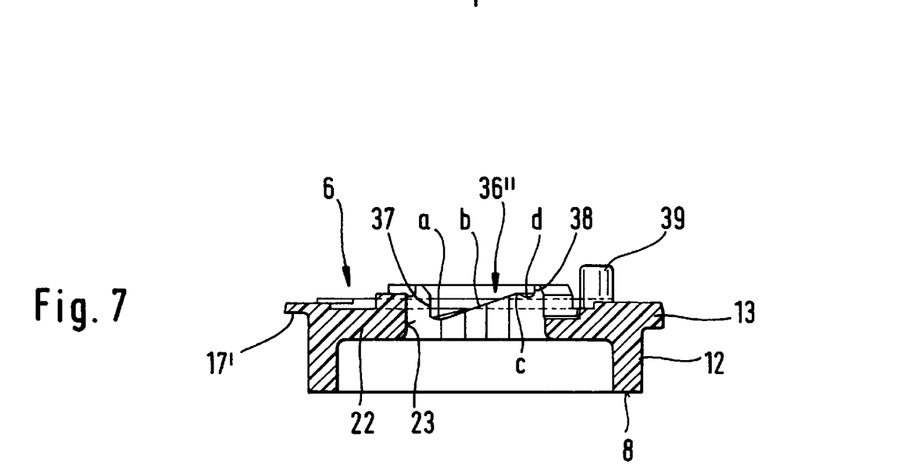
FIG. 7 shows a section along the line VII—VII of FIG. 6.

FIG. 6 shows a plan view of the second clamping member 6 showing especially the opening 23 provided within the disk member 22. This opening 23 is substantially circular and has also a chord 24 like the pin 20 of the first clamp member 5 so that the cross-sections of pin 20 and opening 23 match one another. At the chord 24 a groove 71 is provided that engages the spring 70 provided at the pin 20. In this manner an exact axial guiding of the two clamping members 5, 6 is ensured, and the chords of the circular shape as well as the tongue-groove-arrangement provide for a rotational securing of the two clamping members 5, 6. At the upper side three curved paths 36, 36', 36" extend on a circular arc about the opening 23 and are spaced relative to one another by 120°. The course of the curved path 36 and its arrangement on the disk member 22 is especially clearly shown in FIG. 7 showing a section along the line VII—VII of FIG. 6. The curved paths 36, 36', 36" are identically shaped and comprise a lower depression a as well as a neighboring incline b, an upper dead center c, and an upper depression d.

A cam, riding on the curved path and connected to the pressure member represented in FIG. 1, thus ensures that upon rotation of the pressure member relative to the second clamping member 6 the pressure member is moved away from the disk member 22 of the second clamping member 6 or is moved toward it. The difference in levels between the lower depression a and the upper depression d may be, for example, 2 mm to 2.5 mm. The upper dead center c provides that the cam positioned within the upper depression d cannot be accidentally removed from this depression—the dead center c must first be overcome by a corresponding force. The curved path 36 is delimited by an abutment 37 at the lower depression a an abutment 38 at the upper depression d. FIG. 6 shows that the depression may be an arc-shaped recess 17'.

Figure 8:
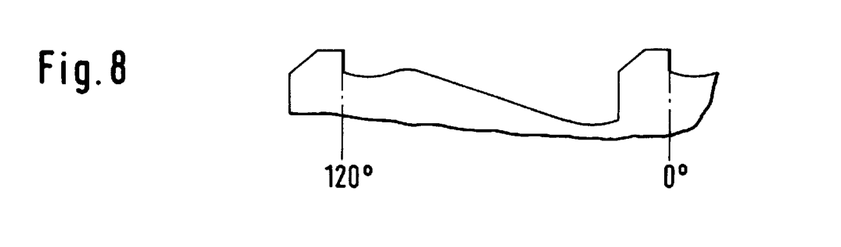
FIG. 8 shows a developed projection of a curved path.

The developed projection of the curved path 36 is represented in FIG. 8. It can be seen that the angular displacement of the respective curved path is 120°. Beginning at the abutment 37, there is first provided the lower depression a from where the upwardly extending incline b projects to the upper dead center point c. This upper dead center point c is in the form of a knob having a transition into the upper depression d which is delimited by further abutment 48. The angular range of movement of the cam between the two end positions in the lower depression a and the upper depression d is preferably in the shown embodiment of FIG. 8 approximately 82°. Radially externally to the curved path 36", according to FIGS. 6 and 7, at the side of the disk member 22 facing the grip 4 a projection 39 in the form of a pin is provided which projects clearly past the upper depression d and the abutment 38 limiting this depression.

Figure 9:
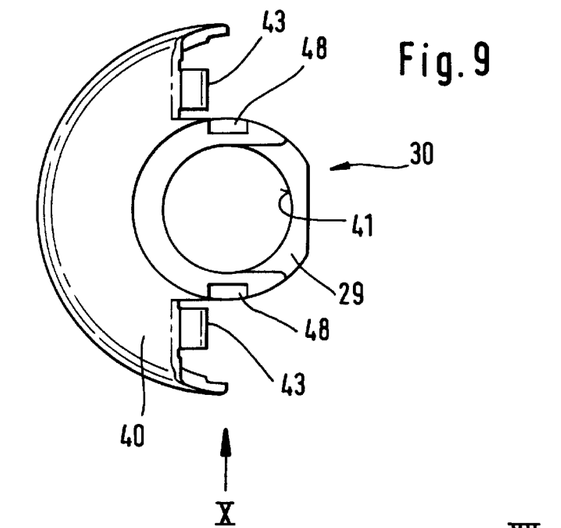
FIG. 9 shows a pressure member as an individual part.

FIG. 9 shows pressure member 30 as an individual part in a view from the top. This view shows clearly that the pressure member 30 is comprised substantially of a ring segment 40 and a ring element 29 formed thereat. The ring segment 40 extends over an angular distance of less than 180° so that the ring element 29 can be provided with two radial openings 48 that extend radially relative to the ring element 29 and are positioned diametrically opposite one another. From the representation of FIG. 10 which is a view in the direction of arrow 10 of FIG. 9, it is clearly apparent that the external shape of the ring segment 40 does not cover the radial openings 48. Instead, they are unobstructed in the radial direction.

Figure 10:
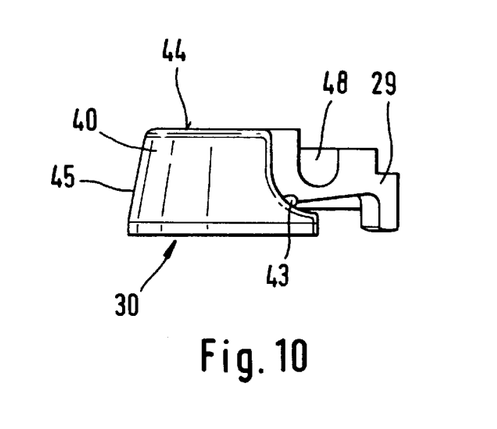
FIG. 10 shows a view in the direction of arrow X in FIG. 9.
Figure 11:
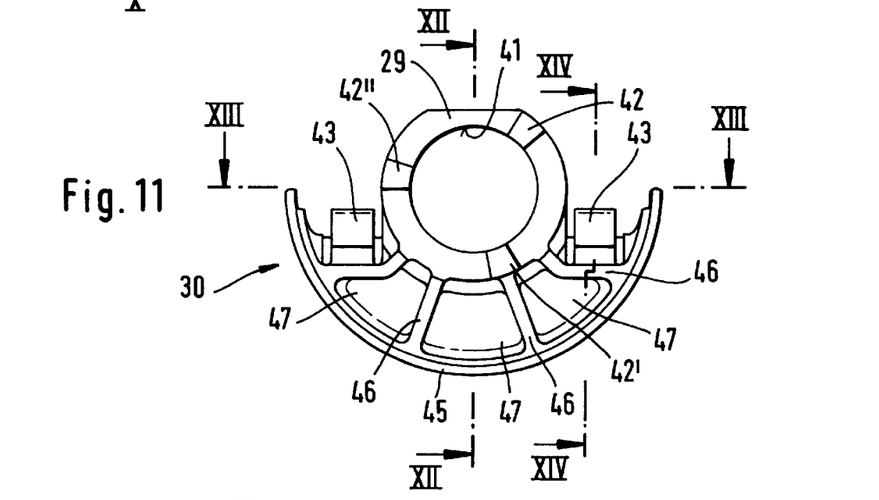
FIG. 11 shows a rear view of the pressure member of FIG. 9.

The ring segment 40 thus is comprised according to FIG. 10 of an exterior wall 45 and an upper side 44 so that the ring segment 40 has a closed mantle surface and a closed upper side. As can be seen especially in FIG. 11, showing a rear view of the pressure member 30 of FIG. 9, it is apparent that the exterior wall 45 is supported with a plurality of stays 46 at the ring element 29 so that between the stays 46 hollow spaces 47 are provided that are delimited by the external wall 45 and the upper side 44. At the free ends of the ring segment 40 a lock 43 is provided which will be explained in more detail in the following in conjunction with the grip.

Figure 12:
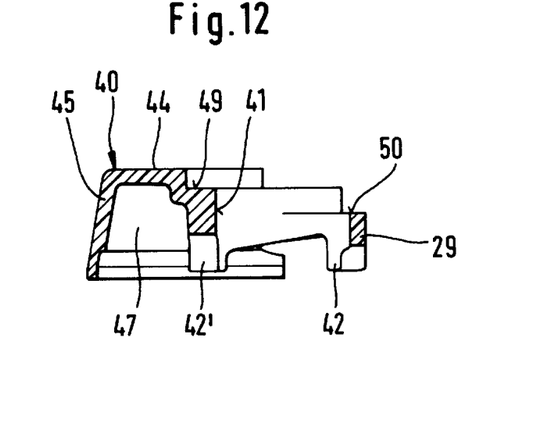
FIG. 12 shows a section along the line XII—XII of FIG. 11.
Figure 13:
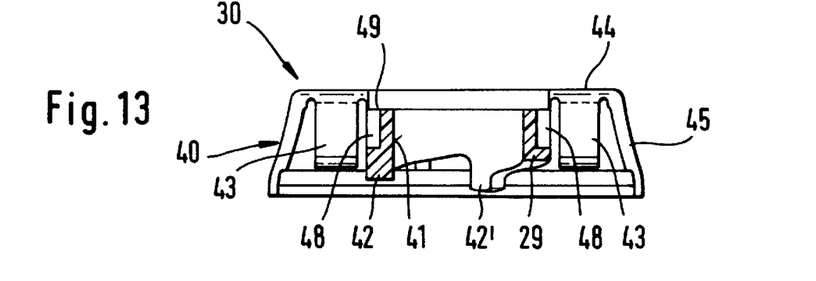
FIG. 13 shows a section along the line XIII—XIII of FIG. 11.
Figure 14:
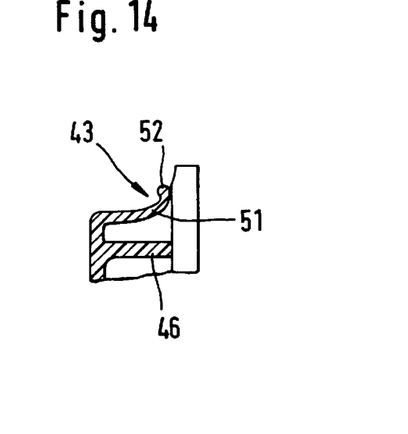
FIG. 14 shows a section along the line XIV—XIV of FIG. 11.

At the underside of the ring element 29 cams 42, 42', 42" are arranged which according to the representation of FIGS. 10 and 13 extend in the direction toward the second clamping member and in the representation according to FIG. 11 are spaced relative to one another by 120°. FIG. 13 shows that the upper side 44 of the pressure member 30 is provided with a cutout 49 which, as disclosed in connection with FIG. 1, serves to receive the cover plate 27 of the securing element. The section along the line XXII—XXII of FIG. 11, as shown in FIG. 12, shows the shape of the exterior wall 45 of the upper side 44 and of the ring element 29 as well as the hollow spaces 47 positioned therebetween. The ring element 29 is provided with a central opening 41 that serves to support the pressure member 30 on the pin 20 provided at the first clamping member. For this purpose, the underside of the ring element 29 as provided with the cutout 50 that extends at a right angle to the longitudinal axis and which is provided for mounting the securing element. FIG. 14 shows a section along XIV—XIV of FIG. 11. It is shown here that an elastic tongue 51 is formed at the stay 46 which extends first parallel to the stay 46 and then is curved outwardly. At the outer end of the elastic tongue 51 a locking projection 52 is provided.

Figure 15:
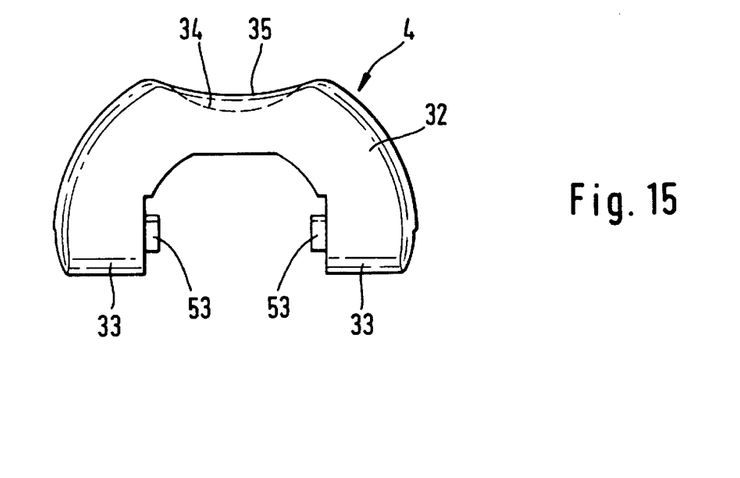
FIG. 15 shows a plan view of a grip as an individual part.

FIG. 15 shows a plan view of the C-shaped bracket 32 that forms the grip 4. At the free ends 33 of the bracket 32 radially inwardly extending pegs 53 are arranged that engage the radial openings 48 of the ring element 29 (compare FIGS. 9 and 10). Due to the stiffness of the bracket 32, the pegs 53 are inserted from above into the radial openings 48 of the pressure member 30.

Figures 16, 17, 18:
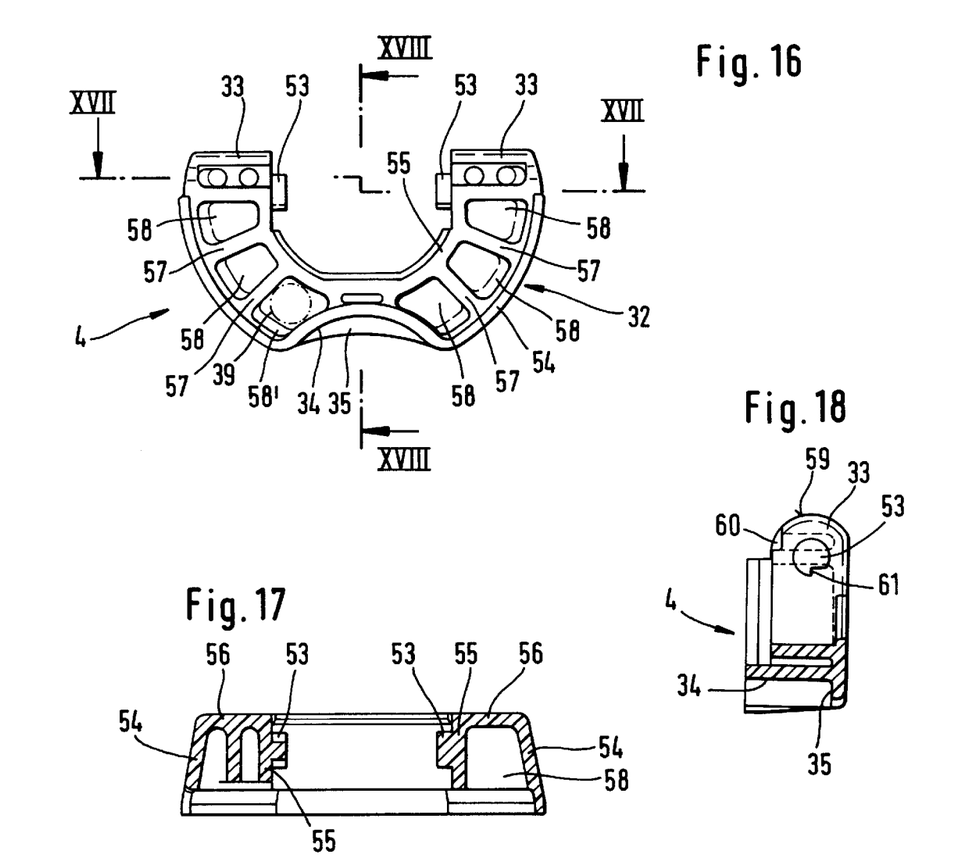
FIG. 16 shows a rear view of the grip of FIG. 15.
FIG. 17 shows a section along the line XVII—XVII of FIG. 16.
FIG. 18 is a section along the line XVIII—XVIII of FIG. 16.
Figure 19:
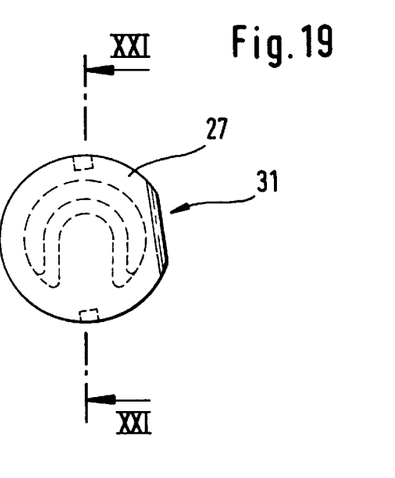
FIG. 19 is a plan view of a securing element as an individual part.

FIG. 16 shows a rearview of the grip 4 that has at the middle of the bracket 32 the recess 34 at the edge covered by the grip edge 35. The grip 4 is substantially comprised of an exterior wall 54, an inner wall 55, and a connecting upper side extending between the two. Between the outer wall 54 and the inner wall 55 the grip 4 is hollow. The required stiffness is provided by having stays 57 that extend between the exterior wall 54 and the inner wall 55. Between the stays 57 hollow spaces 58 are provided so that the grip portion 4, despite its great stiffness, has only a minimal weight. A hollow space 58' is positioned adjacent to the recess 34 and is designed such that it is suitable for receiving the projection 39 at the upper side of the disk member 22 (see FIG. 7) while the other hollow spaces 58 are of such a size that the projection 39 cannot enter. Thus, the grip 4 can only be pivoted into the rest position when the pressure member 30 is in a position in which the closing device is completely and correctly introduced into the fill opening.

FIG. 17 shows a section along the line XVII—XVII of FIG. 16. It can be taken from this drawing that the exterior wall 54, the inner wall 55, and the upper side 56 form a hollow body that is open at its underside. The pin-shaped projections (pegs) 53 are formed as a unitary part of the grip 4.

FIG. 18 shows a section along the line XVIII—XVIII of FIG. 16. This section extends through the recess 34 and through the grip edge 35, i.e., through the area in which the bracket 32 has its minimum cross-section. Furthermore, it can be seen that the free ends 33 have an arc-shaped mantle surface 59. At one end of the arc shape a groove 60 is provided that extends parallel to the pivot axis of the grip 4. When the grip 4 is mounted on the pressure member 30, the locking projection 52 of the elastic tongue 51 rests under prestress at the mantle surface 59 so that, upon reaching the rest position of the grip 4 on the closing device according to the representation of FIG. 1, the locking projection 52 engages the groove 60 and the grip 4 is secured in this position. FIG. 18 also shows that the mantle surface of the peg 53 of the grip 4 has an edge 61 that extends parallel to the axis of rotation of the grip 4.

Figure 20:
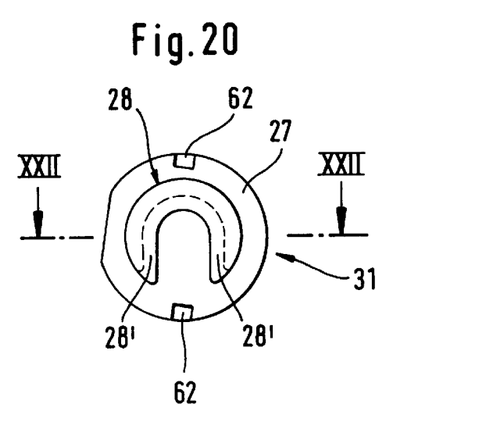
FIG. 20 is a rear view of the securing element of FIG. 19.
Figure 21:
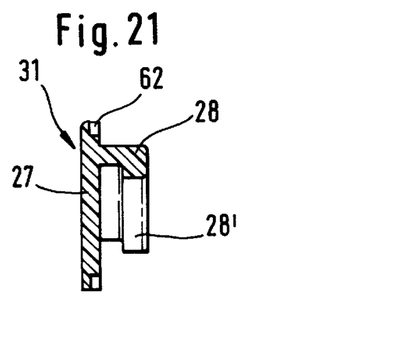
FIG. 21 is a section along the line XXI—XXI of FIG. 19.
Figure 22:
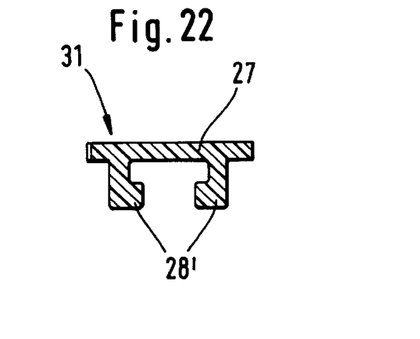
FIG. 22 shows a section along the line XXII—XXII of FIG. 20.

FIGS. 19–22 show different views and sections of the securing element 31 that serves for fastening and securing the second clamping member 6, the pressure member 30, and the grip 4 on the pin 20. The cover plate 27, at the side that is facing the pivot bearing consisting of the radial openings 48 and the pegs 53, is provided with radially extending recesses 62 which are positioned in the area of the upwardly radially extending openings 48 when the securing element 31 is mounted on the pin 20. The sidewalls of the recesses 62 form abutments for the edge 61 of the pegs 53 so that an accidental rotation of the grip 4 about the longitudinal axis L of the closing device is prevented. Only when a corresponding pressure is exerted onto the grip 4 in the direction of the longitudinal axis L of the closing device, the grip 4 can be rotated together with the pressure member 30 on the pin 20. As can be seen in FIG. 20, the securing element 31 at the underside of the cover plate 27 is provided with a U-shaped locking member 28 having laterally and parallel extending legs 28' for engaging the tangential recesses 26 of the pin 20. As can be seen in FIG. 21, the legs 28' of the locking member 28 extend parallel to the cover plate 27 at a predetermined distance.

Figure 23:
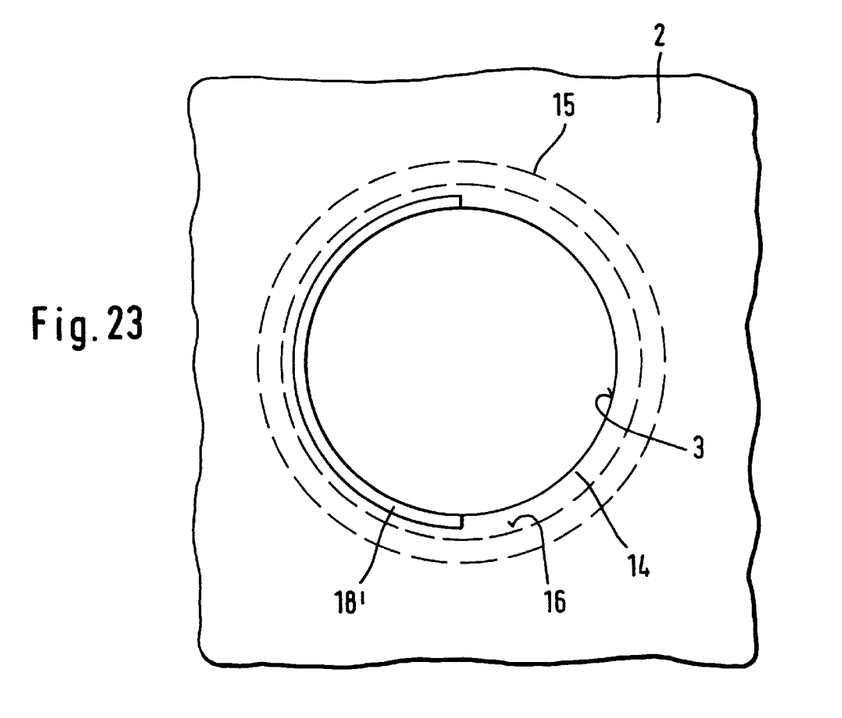
FIG. 23 shows a plan view of the fill opening without tank closure.

FIG. 23 shows a section of the fuel tank 2 with fill opening 3 in a view from the top. The annular bead 15 and the surface 16 are provided at the inner side of the fuel tank and are thus shown in dashed lines. A ring segment 18' is formed as a projection of the edge 14 surrounding the fill opening 3. The ring segment 18' extends over an angular distance of 180° and is designed to be received in the arc-shaped recess 17' of the flange 13 (see FIGS. 6 and 7). In this manner, it is ensured that the closing device 1 cannot be rotated relative to the fuel tank 2 but instead a large surface area support action and a defined mounting position are provided. The latter results in that the closing device 1 can be mounted only in one particular angular position so that the grip 4 relative to the working tool will assume a position ensuring safe handling of the device.

The assembly of the individual parts that form the closing device 1 is disclosed in the following. Onto the pin 20 of the first clamping member 5, after the opening 23 in the disk member 22 has been aligned such that the tongue-and-groove-arrangement coincides, the second clamping member 6 is slipped until the second clamping surface 8 of the ring 12 comes to rest at the first clamping surface 7 of the disk 11. Subsequently, the pressure member 30 with its ring element 29 is slipped onto the pin 20 so that the pressure member 30, relative to the second clamping member 6, is positioned in a rotated position in which the cam 42 is positioned in the lower depression a of the curved path 36. Now, the mounting of the grip 4 on the pressure member 30 takes place by introducing the bracket 32 with its free ends 33, respectively, its pegs 53 into the radial openings 48 at the ring element 29. Since the pressure member 30, due to the position of the cam on the curved path, has a position in which the grip 4 and the pressure member 30 are located closest to the disk 11, the cutouts 50 at the ring element 29 and the tangential recesses 26 at the pin 20 are congruent. When the grip 4 is flipped upward into the actuating position, the securing element 31 with its locking member 28 can be inserted into the tangential recess 26 whereby the parallel legs 28' engage the tangential sections 26' of the tangential recess 26. When the locking device 28 is completely inserted into the tangential recess 26, the pressure member 30 can be lifted again so that the ring element 29 is displaced axially across the locking element 28 of the securing element 31. In this manner, the securing element 31 is fixed on the pin 20. Since the cover plate 27 is positioned within the recess 49 of the pressure member 30, the pressure member 30 is secured on the pin 20. Now the sealing ring 10 is inserted across the edge of the disk 11 into the annular chamber 9 so that the second clamping member 6 is moved into the end position in which the annular chamber 9, due to the spacing between the clamping surfaces 7 and 8, has its greatest volume. Now the closing device 1 is ready for use.

Figure 24:
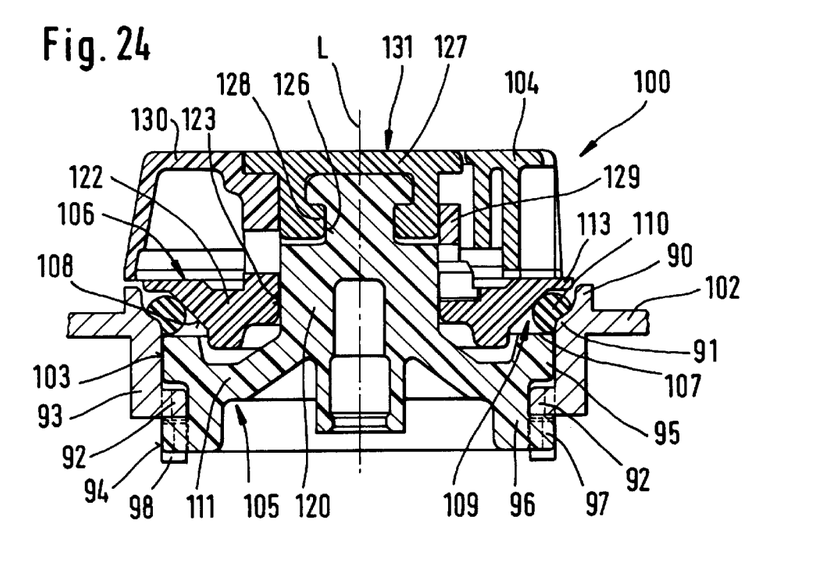
FIG. 24 shows a variation of the embodiment of FIG. 1.

FIG. 24 shows an axial section of a further embodiment of a tank closure in which the closing device 100 is positioned in a fill opening 103 of a fuel tank 102. The fill opening 103 is formed by an annulus 93 as an integral part of the fuel tank 102 whereby the annulus 93 has a step 92 at an end thereof positioned in the interior of the fuel tank. The step 92 is provided with axial projections 94 and radial cutouts 98. The fuel tank 102 is provided with an axially outwardly projecting annular collar 90 which surrounds the fill opening 103 in a circular manner whereby the inner contour of the annular collar 90 is inwardly curved and extends to a curved transition 91 to which is connected the annulus 93. The closing device 100 comprises substantially a first clamping member 105, a second clamping member 106, a grip 104, and a pressure member 130. The clamping members 105 and 106 are axially displaceable relative to one another whereby the first clamping member 105 includes a first clamping surface 107 and the second clamping element 106 comprises a second clamping surface 108. The clamping surfaces 107 and 108 extend at an angle relative to one another and delimit an annular chamber 109. In this annular chamber 109 an elastic sealing ring 110 is positioned which is pressed against the clamping surfaces 107 and 108 as well as against the curved transition 91 of the fill opening 103. This sealing ring 110 is comprised of a mineral oil-resistant material and is advantageously an O-ring.

The first clamping member 105 is a disk 111 which has a radial surface that forms the first clamping surface 107. The second clamping member 106 is a disk 122 the conical contour of which delimiting the annular chamber 109 is the second clamping surface 108. Adjacent to the radially exterior end of the clamping surface 108, a radial flange 113 is positioned which extends into the vicinity of the collar 90. The disk 111 comprises a first axial section 95 the upper end face of which forms the first clamping surface 107. Adjacent to the first axial section 95 a second axial section 96 is provided which projects through the step 92 into the interior of the fuel tank. At the forward end of the second axial section 96 radial projections 97 are provided which engage radial cutouts 98. Since the step 92 is shaped as a ring segment, the axial projections 94 form together with the radial cutouts 98 as well as the radial projections 97 at the second axial section 96 a bayonet closure.

Relative to the first axial section 95, the fill opening 103 has only such minimal play as is required for axially introducing, respectively, removing the closing device 100 from the fill opening 103 of the fuel tank 102. At the disk 111 of the first clamping member 105 a pin 120 is formed which extends coaxially to the longitudinal axis L of the closing device 100. The disk 122 acting as a second clamping member 106 comprises a central opening 123 with which the second clamping member 106 is axially slidably guided on the pin 120. Above the second clamping member 106 a grip 104 and the pressure member 130 are arranged. The grip 104 is fastened to the pressure member 130 which, in turn, is supported with a ring element 129 on the pin 120. For securing the components that are movable relative to the first clamping member 105 on the pin 120, a securing element 131 is provided that includes a locking member 128 which engages a tangential recess 126 at the pin 120. The securing element 131 includes furthermore a cover plate 127 which extends across the upper end of the pin 120 and extends also into a depression of the pressure member 130 so that it cannot slip off the pin 120. The closing device 100 is shown in the clamped position, i.e., the first clamping member 105 and the second clamping member 106 are axially displaced relative to one another such that the annular chamber 109 is reduced in size so that in this manner the sealing ring 110 is pressed by elastic expansion against the curved transition 91 of the fill opening 103. Furthermore, due to the axial forces the radial outer projections 97 are pressed against the radial clamping surfaces of the axiall projections 94 and the step 92. Optionally, at the projections 97 and the step 92, projections, respectively, cutouts can be provided that provide for a positive-locking engagement.

For opening the fuel tank, the grip 104 is pivoted about an axis of rotation that extends at a right angle to the longitudinal axis L of the closing device 100 and the grip 104 is then rotated together with the pressure member 130 about the longitudinal axis L so that the first and second clamping members 105, 106 are moved away from one another. Thus, the distance of the clamping surfaces 107 and 108 is increased so that the annular chamber 109 is also enlarged and the pressing action of the elastic sealing ring 110 against the curved transition 91 is canceled. In this manner, the radial outer projections 97 are also lifted off the clamping surfaces 107, 108 and the optionally present positive-locking connection is also disengaged so that, upon rotation of the closing device 100 about the longitudinal axis L, the bayonet-type closure is released so that the closing device 100 can be removed from the fill opening 103 of the fuel tank 102.

Figure 25:
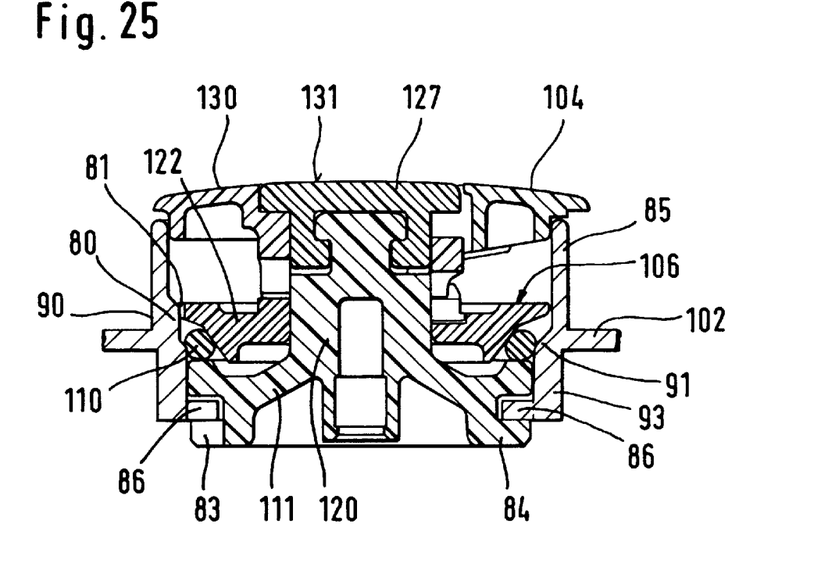
FIG. 25 shows a variation of the embodiment of FIG. 24.
Figure 26:
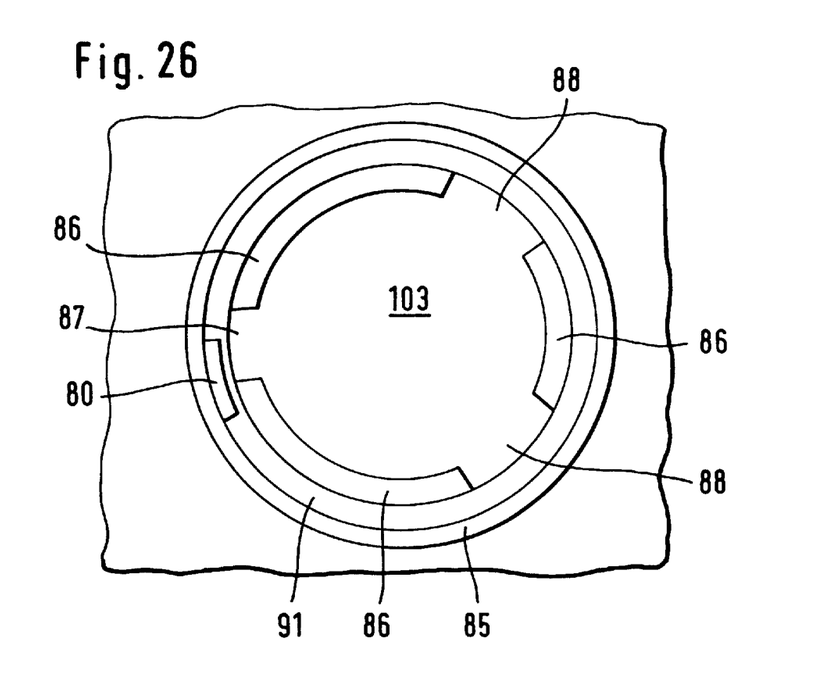
FIG. 26 shows a plan view of a fill opening with the tank closure removed.

FIG. 25 shows a variation of an embodiment of FIG. 24 which in most parts is identical to the aforedescribed embodiment. For same elements the same reference numerals as in FIG. 24 are thus used. FIG. 26 shows a plan view of the fill opening 103 with the closing device removed. At the inner circumference the axial collar 90 is provided with a radially projecting portion 80 which extends only over an angular distance of approximately 25° and engages a corresponding radial recess of the disk member 122.

The collar 90 is provided with a sleeve 85 extending in the axial direction which surrounds the pressure member 130 as well as the grip 104 in the radial direction. Only the upper edge of the pressure member 130, the grip 104, and the securing element 131 projects from the sleeve 85. The fill opening 103 comprises at the lower end of its annulus 93 three ring segments 86 between which recesses 87 and 88 are arranged. The recess 87 extend over a smaller angular distance than the recesses 88 and the angular spacing between the recesses 87 and 88, respectively, the two recesses 88 are not identical.

The present invention is, of course, in no way restricted to the specific disclosure of the specification and drawings, but also encompasses any modifications within the scope of the appended claims.

What we claim is:

1. A tank closure for a fill opening of a fuel tank, said tank closure comprising:

a closing device extending axially through a fill opening of a fuel tank;

said closing device comprising a grip for actuating said closing device;

said grip rotatable about a longitudinal axis of said closing device for closing and opening said tank closure;

said closing device comprising a first clamping member and a second clamping member;

said first and said second clamping members moveable axially toward one another;

said first clamping member having a first clamping surface and said second clamping member having a second clamping surface;

said first and second clamping surfaces facing one another and defining therebetween an annular chamber;

said first and second clamping surfaces positioned at an angle α to one another;

said closing device further comprising a radially elastically expandable sealing ring positioned in said annular chamber;

wherein said first clamping member is a disk and wherein said second clamping member is positioned coaxially to said disk;

wherein said disk has a pin and said second clamping member has an opening;

wherein said pin is received in said opening and has a cross-section matching a contour of said opening so that said second clamping member is axially movably guided by said pin, but said disk and said second clamping member are prevented from rotating relative to one another.

2. A tank closure according to claim 1, wherein said sealing ring in a radially expanded position is pressed against said first and second clamping surfaces and against a wall surface defining said fill opening, wherein said wall surface is frusto-conical.

3. A tank closure according to claim 1, wherein:

said disk is a first disk and comprises at least one first axial section having an upper end face;

said upper end face is said first clamping surface;

said second clamping member is a second disk;

said second disk has a conical mantle surface; and said conical mantle surface is said second clamping surface.

4. A tank closure according to claim 3, wherein said first clamping surface extends at a right angle to said longitudinal axis of said closing device.

5. A tank closure according to claim 1, wherein said disk has a frusto-conical mantle surface and wherein said frusto-conical mantle surface is said first clamping surface.

6. A tank closure according to claim 5, wherein:

said second clamping member comprises a ring positioned coaxially to said disk;

said ring has an end face; and said end face is said second clamping surface.

7. A tank closure according to claim, 6, wherein said second clamping surface extends at a right angle to said longitudinal axis of said closing device.

8. A tank closure according to claim 6, wherein:

said ring comprises a unitary disk member and said opening is provided in said disk member.

9. A tank closure according to claim 8, wherein:

said cross-section and said contour have a circular-arc portion connected by a straight portion;

one of said straight portions has a projection extending parallel to a longitudinal axis of said closing device;

the other of said straight portions has a groove extending parallel to said longitudinal axis of said closing device.

10. A tank closure according to claim 1, wherein said closure device further comprises a pressure member for transmitting an actuating movement of said grip for actuating said tank closure into a relative axial movement of said first and second clamping members.

11. A tank closure according to claim 10, wherein:

said pressure member is supported on said pin so as to be rotatable about said longitudinal axis of said closing device;

said closing device comprising at least one control path extending as a circular arc about said longitudinal axis; and said pressure member cooperating with said at least one control path.

12. A tank closure according to claim 10, wherein:

said disk has a frusto-conical mantle surface and said frusto-conical mantle surface is said first clamping surface;

said pressure member is supported on said pin so as to be rotatable about said longitudinal axis of said closing device;

said closing device comprising at least one control path extending as a circular arc about said longitudinal axis; and said pressure member cooperating with said at least one control path.

13. A tank closure according to claim 12, wherein:

said second clamping element comprises a ring positioned coaxially to said disk;

said pressure member comprises a ring segment including a centrally arranged ring element;

said ring element having an inner diameter matching an outer diameter of said pin;

said ring element having at least one cam connected to a surface facing said ring;

said ring including a surface provided with said at least one control path; and said at least one cam cooperating with said at least one control path.

14. A tank closure according to claim 13, including three of said cams and three of said control paths, wherein said three cams are spaced at an angular distance of 120° relative to one another and wherein said three control paths are spaced at an angular distance of 120° relative to one another, wherein a control stroke of each one of said three control paths extends over an angular distance of 80°.

15. A tank closure according to claim 13, wherein said ring segment has an axial height greater than an axial height of said ring element and wherein a top surface of said ring segment projects upwardly past an upper end of said pin.

16. A tank closure according to claim 10, wherein said grip is a C-shaped bracket having free ends, wherein said free ends are pivotably connected to said pressure member, and wherein a pivoting range of said grip from a rest position into an actuating position is 90°.

17. A tank closure according to claim 16, wherein each one of said free ends has a radially inwardly extending peg and wherein said ring element has matching radial openings for receiving said pegs.

18. A tank closure according to claim 17, further comprising a securing element connected to said pin, wherein:

said grip in said actuating position engages across said securing element and is rotatable together with said pressure member about said longitudinal axis of said closure device;

said securing element comprises a cover plate and a U-shaped locking member connected to said cover plate so as to extend parallel to said cover plate;

said U-shaped locking member comprises parallel legs;

said pin having tangential recesses; and said parallel legs engaging said tangential recesses.

19. A tank closure according to claim 18, wherein said radial openings open toward said cover plate and wherein said cover plate, in areas congruent with said radial openings, has radially extending cutouts having a width of one half a width of said radial openings.

20. A tank closure according to claim 19, wherein:

said pressure member comprising elastic tongues with locking projections;

said free ends of said C-shaped bracket having recesses for receiving said locking projections for securing said grip in said rest position at said pressure member;

said pegs have an edge extending parallel to an axis of rotation of said grip;

said edges, in said actuating position of said grip, are in abutment with a sidewall of said cutouts.

21. A tank closure for a fuel tank, said tank closure comprising:

a fill opening provided at a fuel tank;

a closing device extending axially through said fill opening;

said closing device comprising a grip for actuating said closing device;

said grip rotatable about a longitudinal axis of said closing device for closing and opening said tank closure;

said closing device comprising a first clamping member and a second clamping member;

said first and said second clamping members moveable axially toward one another;

said first clamping member having a first clamping surface and said second clamping member having a second clamping surface;

said first and second clamping surfaces facing one another and defining therebetween an annular chamber;

said first and second clamping surfaces positioned at an angle α to one another;

said closing device further comprising a radially elastically expandable sealing ring positioned in said annular chamber;

wherein said first clamping member is a disk and wherein said second clamping member is positioned coaxially to said disk;

wherein said disk has a pin and said second clamping member has an opening;

wherein said pin is received in said opening and has a cross-section matching a contour of said opening so that said second clamping member is axially movably guided by said pin, but said disk and said second clamping member are prevented from rotating relative to one another;

wherein said fill opening has an annulus extending into an interior of the fuel tank, wherein an end of said annulus in the interior of the fuel tank has a radially inwardly extending step.

22. a tank closure to cliam 21, wherein the fuel tank has an axially outwardly projecting annular collar surrounding said fill opening, wherein said annular collar has an inwardly curved inner wall and wherein said inner wall has a carved transition into an inner wall of said annulus.

23. A tank closure according to claim 21, wherein:

said inner wall of said annular collar has at least one inner radial projection;

said second disk has a radial recess; and said inner radial projection engages said radial recess.

24. A tank closure according to claim 21, wherein said closure device further comprises a pressure member for transmitting an actuating movement of said grip for actuating said tank closure into a relative axial movement of said first and second clamping members.

25. A tank closure according to claim 24, further comprising an axially outwardly projecting annular collar provided at the fuel tank and surrounding said fill opening and a sleeve connected to said annular collar, wherein said sleeve radially surrounds said pressure member and said grip.

26. A tank closure according to claim 21, wherein said first disk comprises a second axial section extending coaxially through said radially inwardly extending step and positive-lockingly secured thereat.

27. A tank closure according to claim 26, wherein:

said radially inwardly extending step has at least two ring segments and recesses interposed between said ring segments;

said radially inwardly extending step having cutouts at an end face thereof facing the interior of the fuel tank;

said second axial section comprises outer radial projections extending into said recesses interposed between said ring segments and engaging said cutouts.

28. A tank closure according to claim 27, wherein three of said ring segments, three of said recesses, and three of said outer radial projections are provided and wherein at least one of said ring segments and one of said recesses extend over an angular distance different from an angular distance of the remaining ones of said ring segments and said recesses.

29. A tank closure according to claim 21, wherein said second clamping member comprises a ring positioned coaxially to said disk, said ring has an end face, and said end face is said second clamping surface.

30. A tank closure according to claim 29, wherein said disk has a first outer diameter and said ring has a second outer diameter and wherein said first and said second outer diameters have minimal play relative to a diameter of said fill opening so as to allow removal of said closing device from said fill opening.

31. A tank closure according to claim 29, wherein said ring comprises a flange remote from said annular chamber and wherein said fill opening has a peripheral edge, wherein said flange rests at said peripheral edge of said fill opening.

32. A tank closure according to claim 31, wherein:

said flange has at least one arc-shaped recess extending over an angular distance of up to 180°;

said fill opening has an annular segment connected to said peripheral edge for engaging said arc-shaped recess;

said annular segment extends over an annular distance identical to said angular distance of said arc-shaped recess.

* * * * *